US009348751B2

(12) United States Patent
Van Dyke

(10) Patent No.: US 9,348,751 B2
(45) Date of Patent: May 24, 2016

(54) SYSTEM AND METHODS FOR DISTRIBUTING A POWER-OF-TWO VIRTUAL MEMORY PAGE ACROSS A NON-POWER-OF TWO NUMBER OF DRAM PARTITIONS

(75) Inventor: James M. Van Dyke, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1372 days.

(21) Appl. No.: 12/887,432

(22) Filed: Sep. 21, 2010

(65) Prior Publication Data

US 2011/0078359 A1 Mar. 31, 2011

Related U.S. Application Data

(60) Provisional application No. 61/245,982, filed on Sep. 25, 2009.

(51) Int. Cl.
G06F 12/02 (2006.01)
G06F 12/06 (2006.01)
G06F 12/10 (2016.01)

(52) U.S. Cl.
CPC ........ G06F 12/0607 (2013.01); G06F 12/0292 (2013.01); G06F 12/06 (2013.01); G06F 12/10 (2013.01)

(58) Field of Classification Search
CPC . G06F 12/0292; G06F 12/06; G06F 12/0607; G06F 12/10
USPC ............. 711/5, 105, 200, 203, 212, 217, 220; 345/564, 572
See application file for complete search history.

(56) References Cited

U.S. PATENT DOCUMENTS

| 5,379,356 | A  | * | 1/1995 | Purcell et al. | 382/233 |
|---|---|---|---|---|---|
| 6,381,668 | B1 | * | 4/2002 | Lunteren | G06F 12/0607 711/157 |
| 6,381,669 | B1 | * | 4/2002 | Chudnovsky et al. | 711/5 |
| 6,453,380 | B1 | * | 9/2002 | Van Lunteren | G06F 12/0607 711/157 |
| 7,318,114 | B1 | * | 1/2008 | Cypher | G06F 12/0607 711/127 |
| 7,620,793 | B1 | * | 11/2009 | Edmondson et al. | 711/208 |
| 7,884,829 | B1 | * | 2/2011 | Van Dyke et al. | 345/544 |
| 7,932,912 | B1 | * | 4/2011 | Van Dyke | 345/544 |
| 8,072,463 | B1 | * | 12/2011 | Van Dyke et al. | 345/568 |
| 2004/0093457 | A1 | * | 5/2004 | Heap | 711/5 |
| 2005/0240750 | A1 | * | 10/2005 | Lin | 711/203 |
| 2006/0067146 | A1 | * | 3/2006 | Woo et al. | 365/206 |
| 2007/0022261 | A1 | * | 1/2007 | Young | G06F 13/1647 711/157 |
| 2010/0262751 | A1 | * | 10/2010 | Avudaiyappan | 711/5 |
| 2011/0047346 | A1 | * | 2/2011 | Cypher | G06F 12/0607 711/202 |

* cited by examiner

*Primary Examiner* — Arpan P. Savla

(74) *Attorney, Agent, or Firm* — Artegis Law Group, LLP

(57) ABSTRACT

One embodiment of the present invention sets forth a technique for computing dynamic random access memory (DRAM) addresses from linear physical addresses for memory subsystems implementing integral power of two virtual page sizes, and an arbitrary number of available partitions. Each DRAM address comprises a row address, column address, bank address, and partition address. The linear physical address is used to generate to the DRAM address in units of a DRAM bank size. Address scrambling may be implemented to overcome transient access contention to specific DRAM pages by multiple client modules.

20 Claims, 9 Drawing Sheets

SYSTEM AND METHODS FOR DISTRIBUTING A POWER-OF-TWO VIRTUAL MEMORY PAGE ACROSS A NON-POWER-OF TWO NUMBER OF DRAM PARTITIONS

CROSS-REFERENCE TO RELATED APPLICATIONS

This application claims priority benefit to United States provisional patent application titled, "ADDRESSING NON POWER OF TWO MEMORY," filed on Sep. 25, 2009 and having Ser. No. 61/245,982.

BACKGROUND OF THE INVENTION

1. Field of the Invention

The present invention generally relates to physical memory systems and more specifically to systems and methods for addressing physical memory.

2. Description of the Related Art

Modern processing units, such as graphics processing units (GPUs) and central processing units (CPUs), conventionally implement a virtual memory model, which presents a virtual address space to certain client modules within a given processing unit. The virtual address space is organized as a plurality of virtual pages that are each an integral power of two in size. A memory management unit maps virtual pages into physical pages of corresponding size within an attached memory subsystem. The memory subsystem comprises a plurality of discrete memory storage devices, such as dynamic random access memory (DRAM) devices, organized as independently operable partitions. Each partition includes one or more of the DRAM devices. Each physical page is conventionally interleaved over the partitions and further interleaved over DRAM pages associated with the partitions. A conventional memory management unit maps virtual pages into a physical address space comprising an integral power of two partitions. Upper address bits for the virtual page are translated to an arbitrary, page-aligned physical address. Lower address bits for the virtual page that define an address within the virtual page are mapped directly to corresponding physical address bits. This address mapping technique requires a power of two number of identical partitions.

In certain manufacturing scenarios, a technique known in the art as "floor sweeping" is used to yield functionally acceptable processing units that would otherwise be discarded because they include one or more manufacturing faults. Specifically, when the manufacturing faults do not interfere with essential functions, a processing unit may be salvaged and used as a fully functional device with an appropriately reduced functional specification. One common manufacturing fault in processing units occurs in partition circuitry. However, a failed partition typically means that only a non-power of two number of partitions is available, a scenario that is incompatible with requirements of the memory management unit. Without a properly functioning memory management unit, the processor cannot be salvaged via floor sweeping.

Accordingly, what is needed in the art is a technique for enabling virtual addressing in memory subsystems comprising a non-power of two number of operable partitions.

SUMMARY OF THE INVENTION

One embodiment of the present invention sets forth a method for generating a dynamic random access memory (DRAM) address from a linear address. The method includes the steps of computing a remainder by dividing a page address by a partition count, where the page address represents upper address bits of the linear address, and computing a quotient by dividing the page address by the partition count. The method also includes the steps of assigning a partition address to the remainder, where the partition address identifies one partition from a plurality of memory partitions, assigning a bank address to a first portion of the quotient, where the bank address identifies one bank from a plurality of banks within a DRAM device, assigning a column address to a set of lower bits of the linear address, where the column address identifies one unit of data from a row of data within the DRAM device, and assigning a row address to a second portion of the quotient, where the row address identifies one row from a plurality of rows within the DRAM device. The partition address, bank address, column address and row address comprise the DRAM address.

One advantage of the disclosed method is that a processing unit may operate efficiently using a virtualized memory model in a configuration having an arbitrary number of active partitions, such as non integral power of two partitions. With this capability, processing units, which may otherwise be discarded as being defective, may be salvaged using floor sweeping techniques. In addition, this capability allows greater flexibility when configuring processing units for specific applications . . . .

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
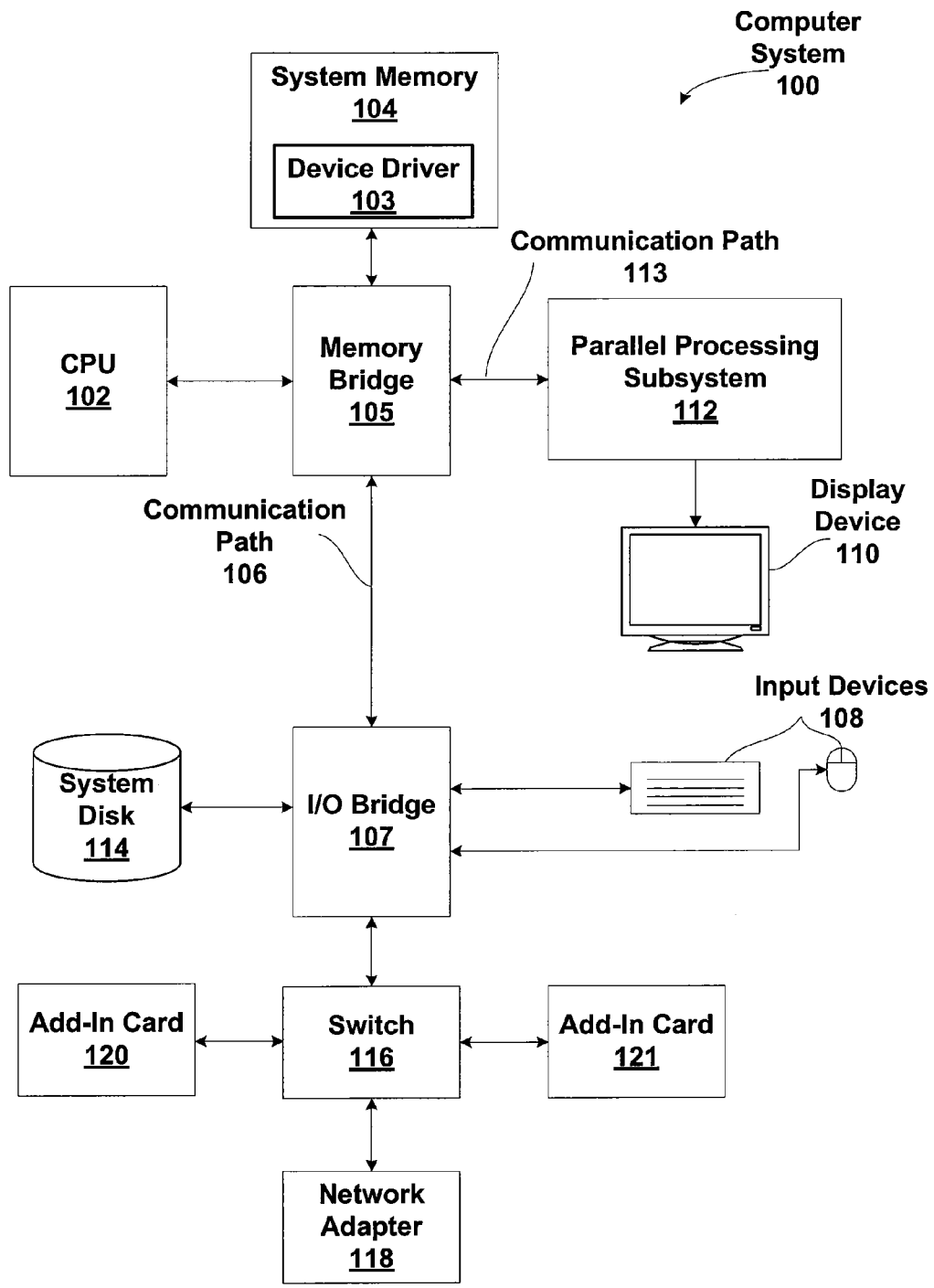
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
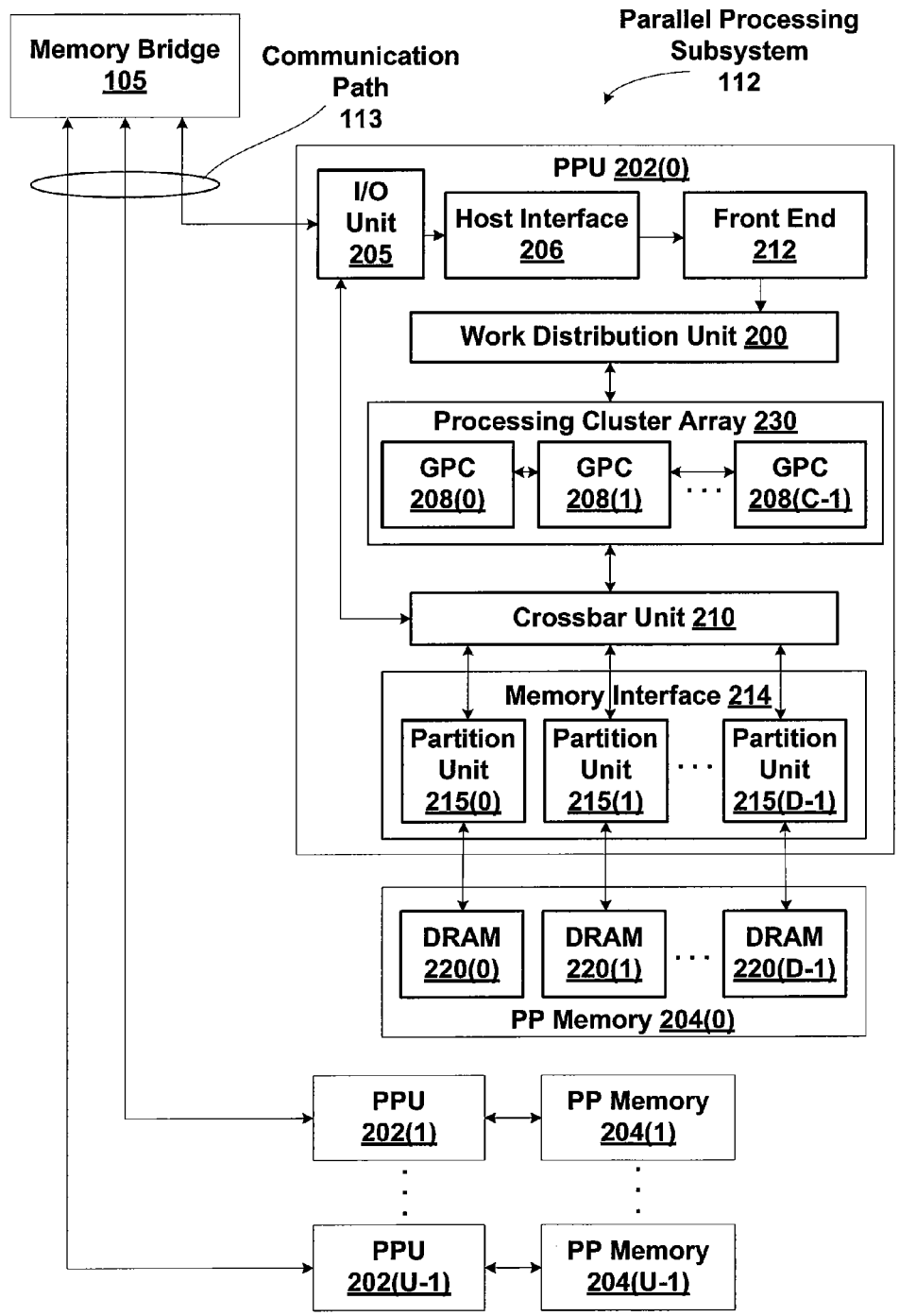
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
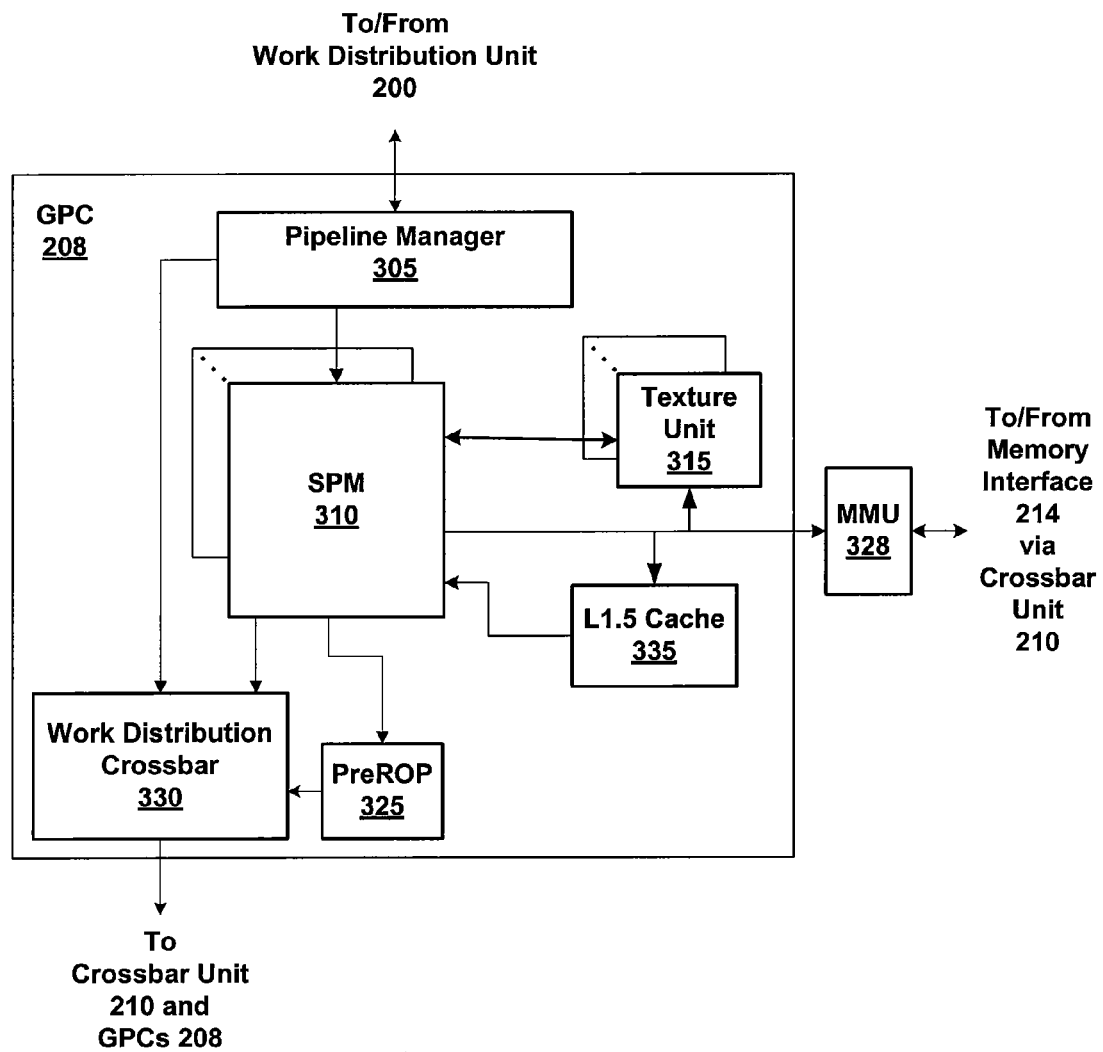
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
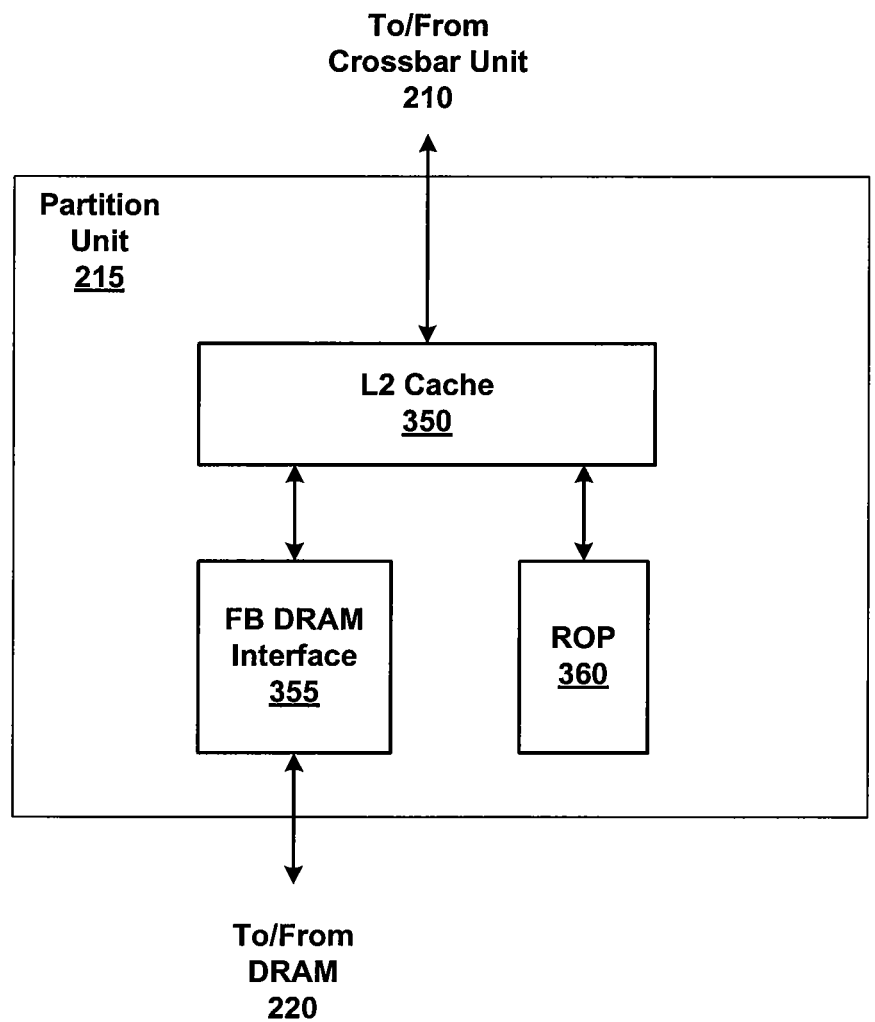
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
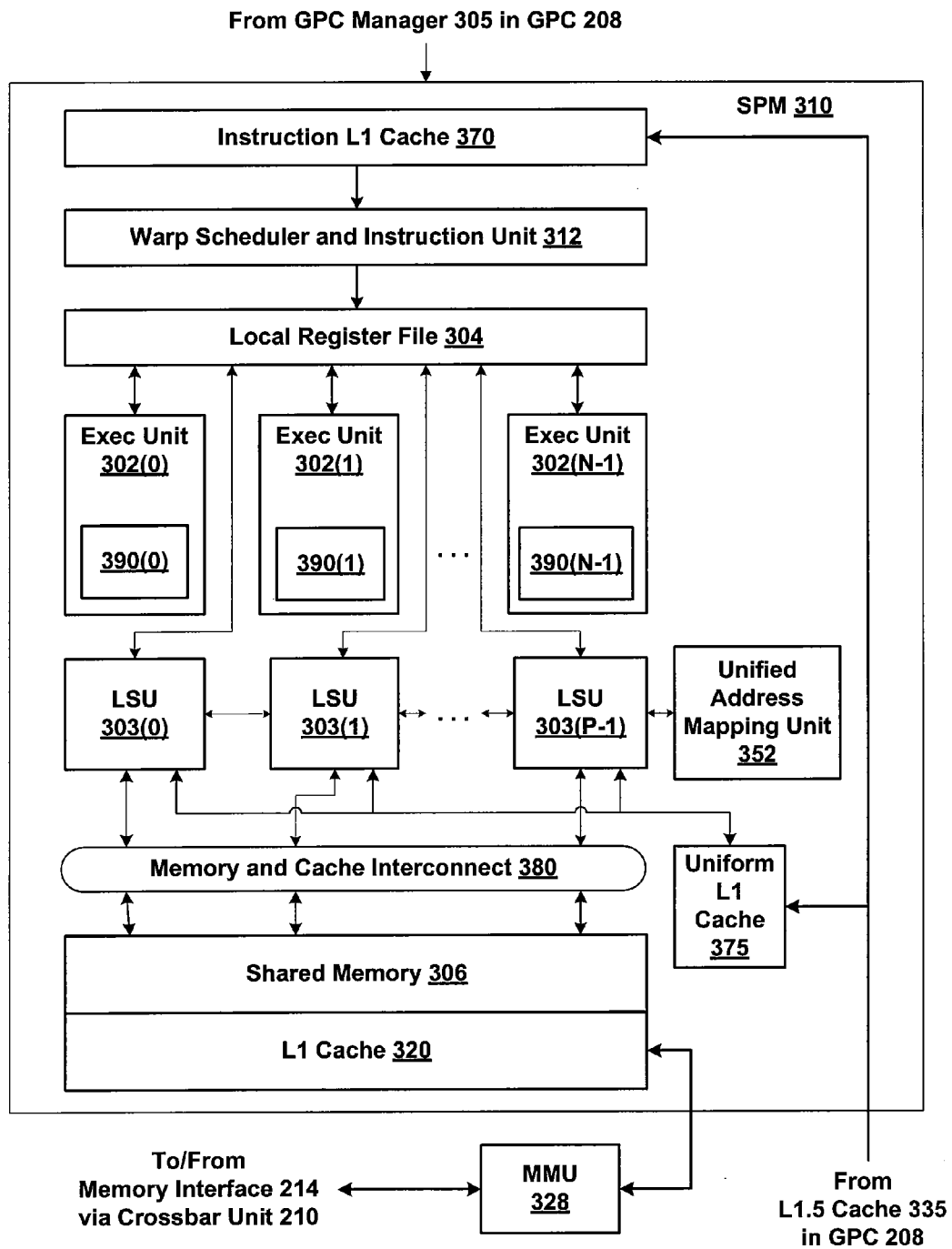
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Each parameter unit 390 within a corresponding execution unit 302, is configured to generate a fixed-point parameter. In one embodiment the fixed-point parameter represents a value from 0.0 to 1.0 with sixteen-bit resolution. The fixed-point parameters are generates to provide an integral number of divisions between 0.0 and 1.0. A given fixed-point parameter may be accessed by a shading program executing on a respective execution unit 302.

In other implementations, the parameter unit 390 may reside in other locations. For example, in one embodiment, a different parameter unit 390 may reside within each GPC 208 separate and distinct from the SPM 310.

Graphics Pipeline Architecture

Figure 4:
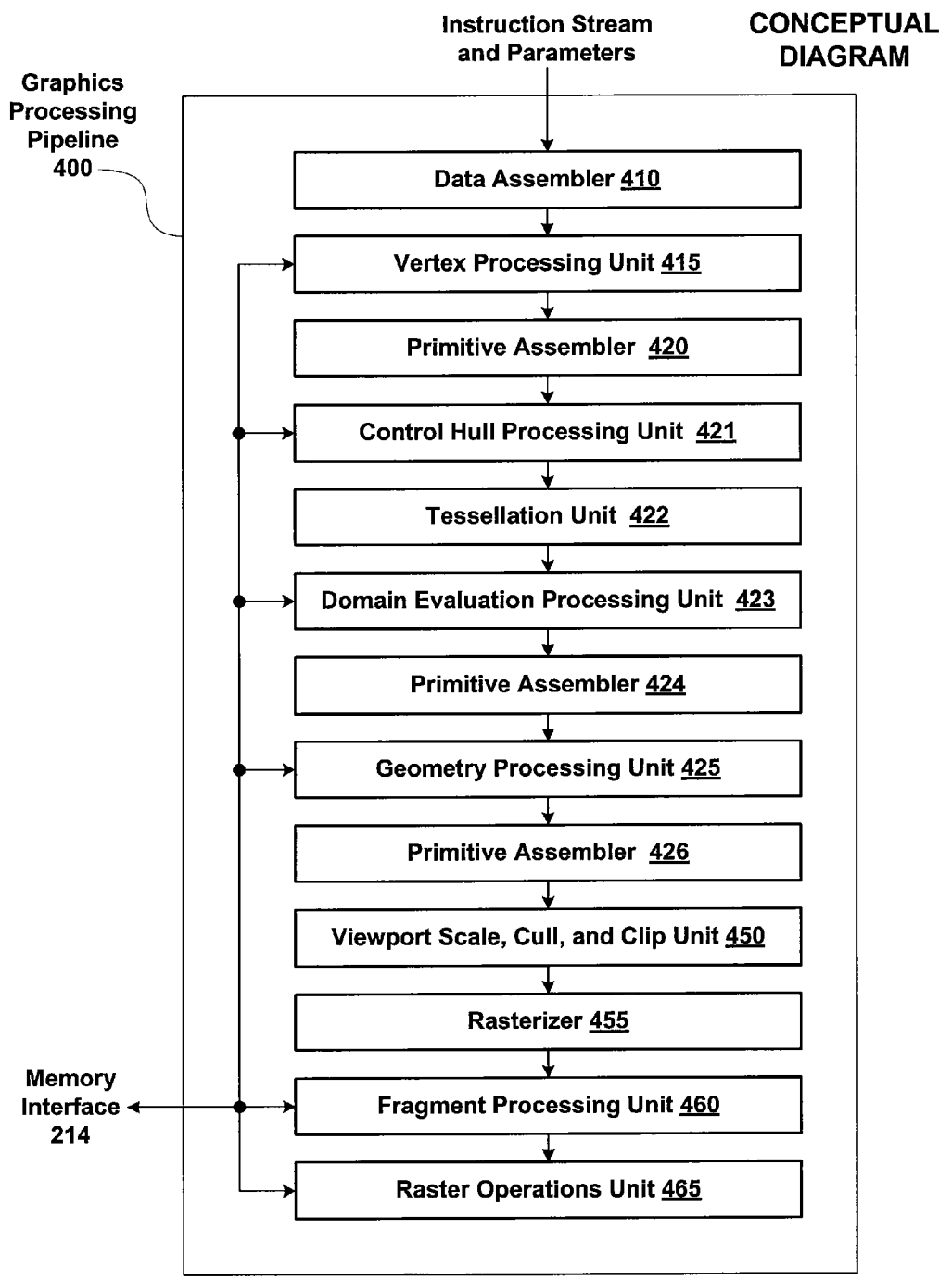
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by control hull processing unit 421. Graphics primitives include triangles, line segments, points, and the like.

The control hull processing unit 421 transforms control points for a geometric patch from a basis representation to an application representation for tessellation. The control hull processing unit 421 also computes tessellation factors for edges of geometric patches. A tessellation factor applies to a single edge and quantifies a view-dependent level of detail associated with the edge. A tessellation unit 422 is configured to receive the tessellation factors for edges of a patch and to tessellate the patch into multiple geometric primitives such as triangle or quad primitives, which are transmitted to a domain evaluation processing unit 423. The domain evaluation processing unit 423 operates on parameterized coordinates for a geometric primitive to generate a surface representation and vertex attributes for each vertex associated with the geometric primitive.

Primitive assembler 424 receives vertex attributes from domain evaluation processing unit 423, reading stored vertex attributes, as needed, and constructs graphics primitived for processing by geometry processing unit 425. Geometry processing unit 425 is a programmable execution unit that is configured to execute geometry shader programs, transforming graphics primitives received from primitive assembler 424 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to primitive assembler 426, which receives the parameters and vertices from the geometry processing unit 425, reading stored vertex attributes, as needed, and constructs graphics primitives for processing by a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Addressing Memory System with Arbitrary Partitions

Figure 5:
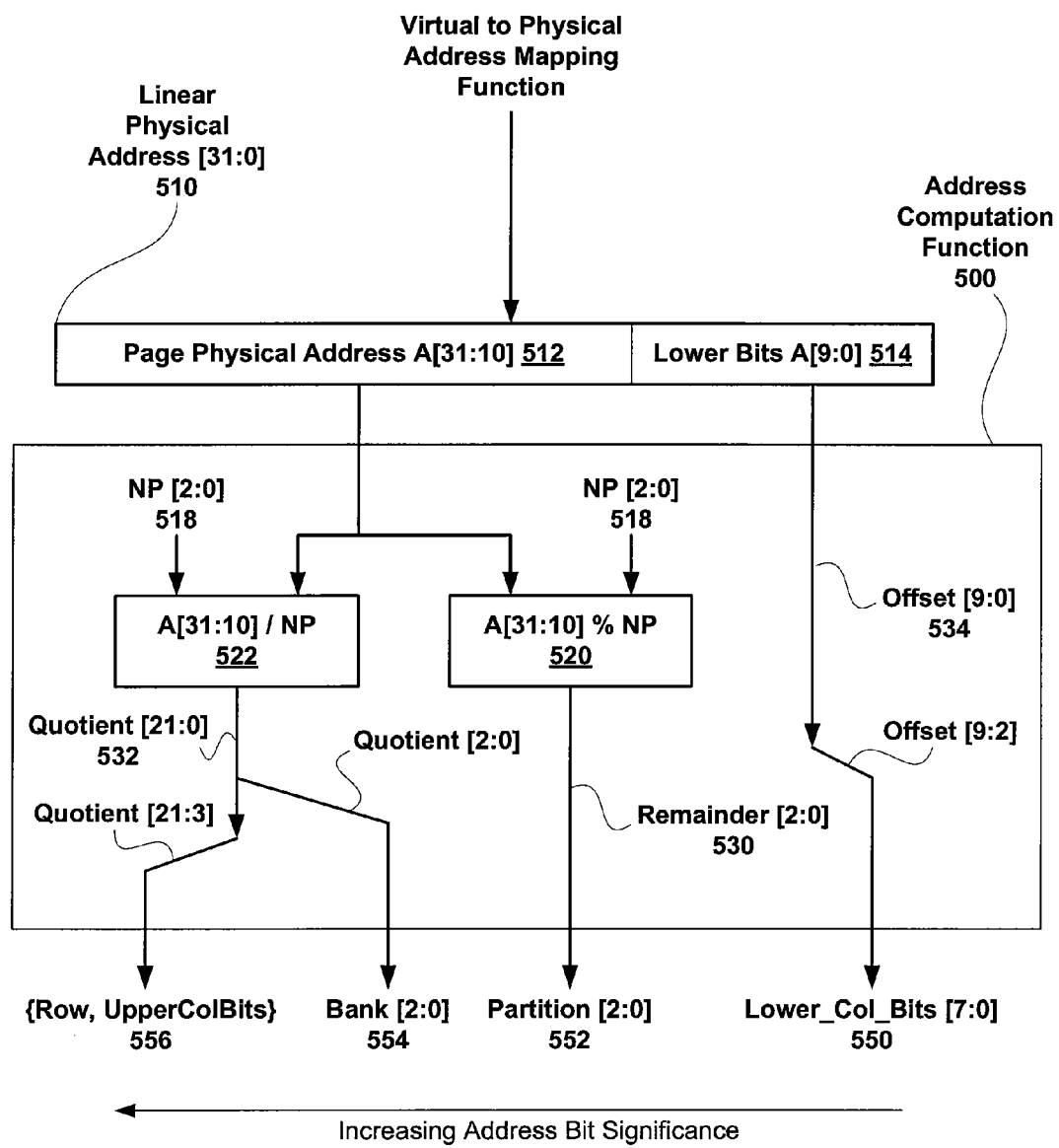
FIG. 5 illustrates an address computation function configured to compute row, bank, partition, and column address fields from a linear physical address, according to one embodiment of the present invention.

FIG. 5 illustrates an address computation function 500 configured to compute row, bank, partition, and column address fields from a linear physical address, according to one embodiment of the present invention. In one embodiment, a thirty-two-bit linear physical address 510 is generated by a virtual to physical address mapping function that is associated with the processing cluster array 230. Any technically feasible technique may be used to implement the virtual to physical address mapping. For example, the MMU 328 of FIG. 3A receives virtual addresses from SPMs 310 and translates the virtual addresses to linear physical addresses using a system of page tables. The page tables map a given virtual address to the linear physical address via a page table entry (PTE). Each PTE includes a page physical address 512, which represents a set of most significant bits of a corresponding linear physical address 510. A translation look aside buffer (TLB) may be used to cache mappings to specific PTEs. The linear physical address 510 comprises the page physical address 512 and a field of lower address bits 514. The page physical address 512 represent a page-aligned linear physical address for a one-kilobyte (1 KB) page of data within PP memory 204 of FIG. 2. The lower address bits 514 are conventionally copied from equivalent lower address bits of the virtual address. The lower address bits 514 select a unique byte address within the 1 KB page.

A modulo divider 520 computes a remainder 530 of the page physical address 512 divided by a number of available partitions (NP) 518. Starting at a zero base address for the linear physical address 510 and incrementing through available memory, the remainder 530 generates a sequence of available partitions, such as those implemented by partition units 215. The remainder 530 represents a partition address 552.

A quotient divider 522 computes a quotient 532 of the page physical address 512 divided by NP 518. The least significant three bits of quotient 532 represent a bank address 554 for DRAMs 220. The bits of quotient 532 above the least significant three bits represent a row and upper column address 556 for DRAMs 220. If DRAMs 220 implement two-kilobyte (2 KB) banks, then the least significant bit of the row and upper column address 556 is used as the most significant column address bit and remaining bits of the row and upper column address 556 are used as a row address. However, if DRAMs 220 implement 1 KB banks, then the row and upper column address 556 is used entirely as the row address. In one embodiment, modulo divider 520 and quotient divider 522 are implemented as a combined math circuit. In an alternative embodiment, modulo divider 520 and quotient divider 522 are implemented separately.

NP 518 is an integer value representing a number of available partition units 215. In certain scenarios, NP 518 is an integral power of two (1, 2, 4, 8, 16, etc.). In other scenarios, NP 518 is not an integral power of two (3, 5, 6, 7, etc.). Proper addressing is achieved for any integer value, starting with one. NP 518 may be a non integral power of two because one or more partition units 215 are disabled from a manufacturing fault, or because additional partition units 215 are purposely made available in a particular design. For example, a PPU 202 may be configured to implement ten partition units 215. After manufacturing tests have determined which partition units are fully functional, ten or fewer partition units 215 may be available.

The lower address bits 514 represent an offset 534 into the 1 KB page. In the present embodiment, 32 bytes are accessed simultaneously per partition. To address 32 bytes at a time, the most significant five bits of the offset 534 are used as lower column bits 550. If DRAMs 220 implement 2 KB banks, the most significant column bit becomes the least significant bit of row address 556. If DRAMs 220 implement 1 KB banks, all column bits 550 are used as the column address for the DRAMs 220.

The present technique for address computation is summarized in Table 1 as pseudo-code. In the pseudo-code of table 1, "A☐" represents linear physical address 510, "NP" represents a number of available partitions, "offset" represents offset 534, "remainder" represents remainder 530, "quotient" represents quotient 532, "lowerColumnBits" represents lower column bits 550, "partition" represents partition address 552, "bank" represents bank address 554, and "{row, upperColumnBits}" represents row and upper column address 556. The "%" symbol is a modulo operator, and the "{ }" symbols represent concatenation.

TABLE 1 offset[9:0] = A[9:0]
remainder[2:0] = A[31:10] % NP
quotient[21:0] = A[31:10] / NP
lowerColumnBits = offset[9:2]
partition[2:0] = remainder[2:0]
bank[2:0] = quotient[2:0]
{row, upperColumnBits} = quotient[21:3]

Persons skilled in the art will recognize that different bit widths may be implemented for the linear physical address 510, row and upper column address 556, bank address 554, partition address 552, and lower column bits 550 without departing the scope or spirit of the present invention. For example, the linear physical address 510 may include more than thirty-two bits, or the partition address 552 may implement more than three bits.

Figure 6:
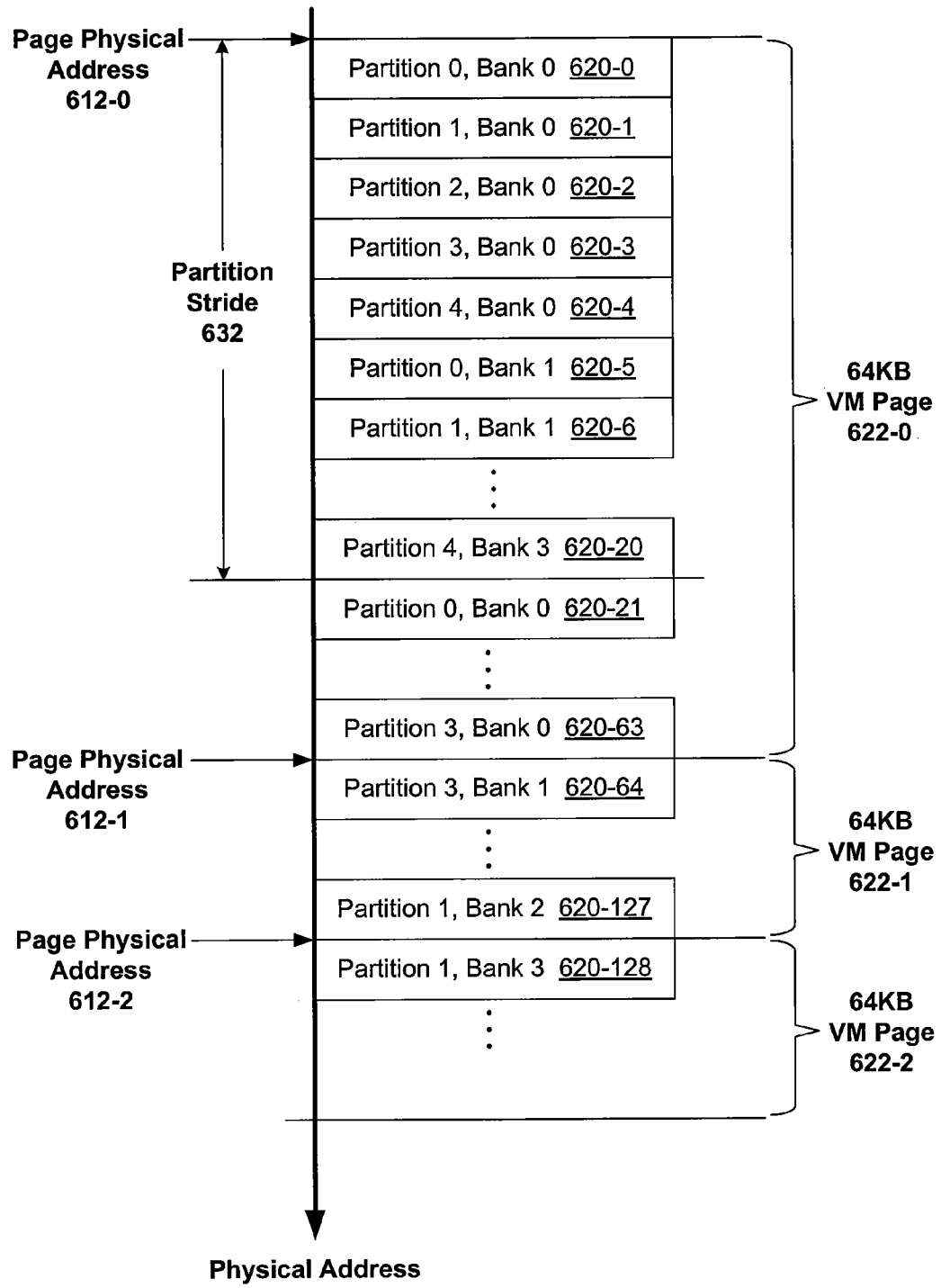
FIG. 6 illustrates sixty-four kilo-byte (64 KB) virtual memory pages mapping in to a set of one kilo-byte (1 KB) dynamic random access memory (DRAM) banks, according to one embodiment of the present invention.

FIG. 6 illustrates sixty-four kilo-byte (64 KB) virtual memory pages 622 mapping in to a set of 1 KB DRAM banks 620, according to one embodiment of the present invention. Each virtual memory (VM) page 622 comprises sixty-four-kilobytes (64 KB) of contiguous data within a virtual address space. The 64 KB VM pages 622 are mapped on to sixty-four 1 KB DRAM pages that are contiguous with respect to a corresponding linear physical address, such as the linear physical address space of FIG. 5. As shown, each 64 KB VM page 622 is mapped to a page physical address 612, which is sixty-four kilo-bytes aligned with respect to physical address. A partition stride 632 represents a complete set of DRAM banks and partitions, starting with partition zero and bank zero, and ending with a maximum partition and bank number.

If PP memory 204 of FIG. 2 includes an integral power of two partitions, then the 64 KB VM page 622 represents an integral multiple of the partition stride 632. However, if the PP memory 204 includes a non integral power of two partitions, then the 64 KB VM page 622 does not represents an integral multiple of the partition stride 632, and a given page physical address 612 may not start at bank zero and partition zero. In this example, five (not an integral power of two) partitions are available. While 64 KB VM page 622-0 has a page physical address 612 that maps to DRAM bank 620-0 (partition zero, bank zero), 64 KB VM page 622-1 starts at DRAM bank 620-64, which corresponds to partition three, bank one. In such a scenario, each 64 KB VM page 622 does not map equally to the five partitions. While one partition may receive more access requests, access is nonetheless generally spread over the five available partitions. Persons skilled in the art will recognize that embodiments of the present invention may be used for virtual page sizes of any integral power of two at least as large as a 1 KB. For example virtual page sizes of four kilo-bytes (4 KB) or one-hundred-twenty-eight kilo-bytes (128 KB) may be implemented. Furthermore, in certain embodiments, multiple virtual page sizes may coexist.

Figure 7:
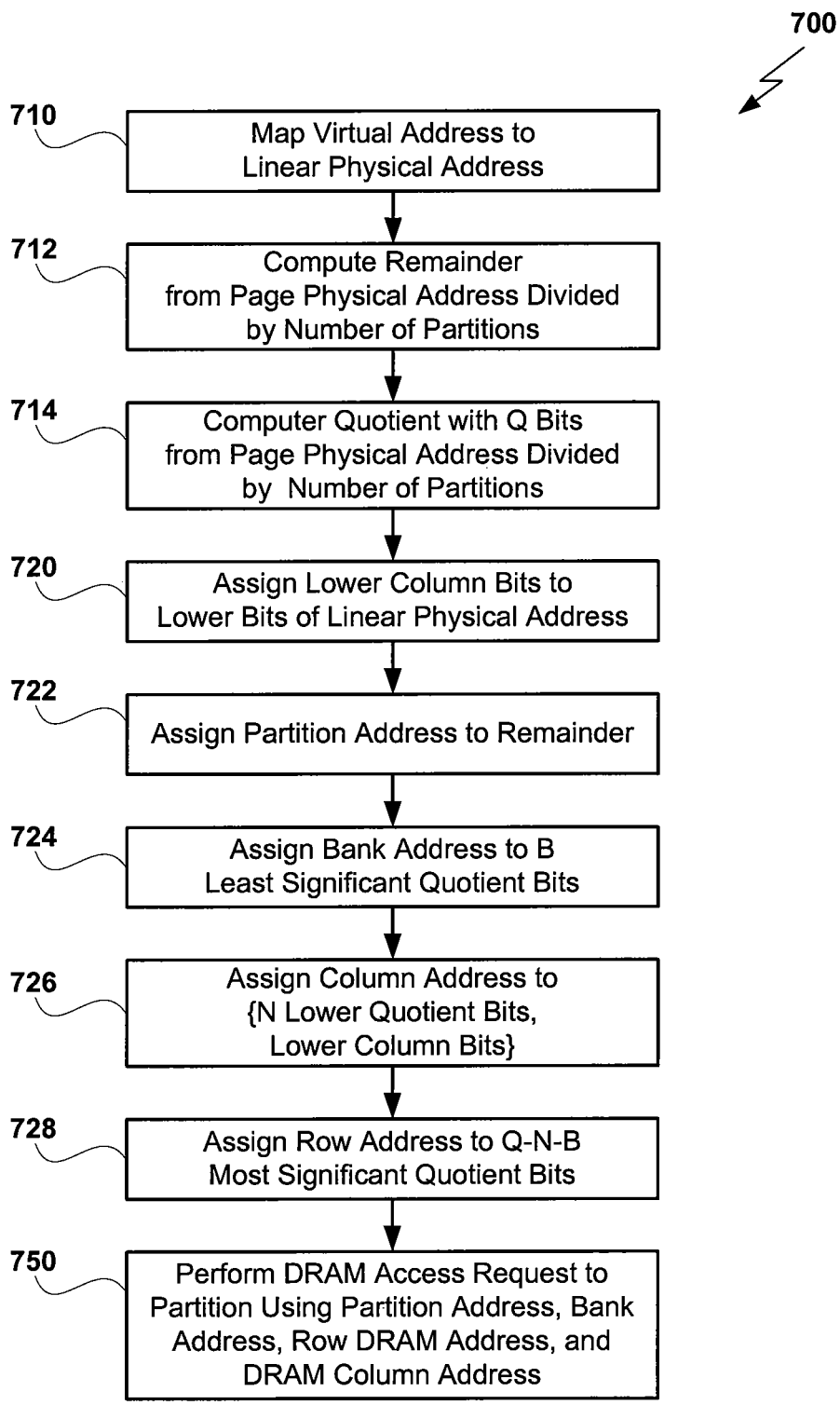
FIG. 7 is a flow diagram of method steps for computing a DRAM address from a linear physical address, according to one embodiment of the present invention.

FIG. 7 is a flow diagram of method steps 700 for computing a DRAM address from a linear physical address, according to one embodiment of the present invention. Although the method steps are described in conjunction with the systems of FIGS. 1-5 persons skilled in the art will understand that any system configured to perform the method steps, in any order, is within the scope of the invention.

The DRAM address comprises a DRAM column address, a partition address, a DRAM bank address, and a DRAM row address. The DRAMs 220 have an actual DRAM bank size of either 1 KB, 2 KB, 4 KB, or another integral power of two number of bytes. In one embodiment, a 1 KB effective bank size is implemented for addressing DRAMs 220.

The method begins in step 710, where a virtual address is mapped to a linear physical address. Any technically feasible mapping technique may be used to perform this step. For example, a conventional system of page mapping tables may be used to index into a page table entry (PTE) configured to include a physical address field. The physical address field stores a page-aligned page physical address, such as page physical address 612 of FIG. 6, for a corresponding virtual address being mapped. The page physical address represents upper address bits of a linear physical address. Lower bits of the linear physical address are copied from the virtual address to provide byte-level or word-level addressing granularity. In a system implementing a thirty-two-bit linear physical address space and DRAMs 220 of FIG. 2 implementing 1 KB DRAM pages, the page physical address stored in the PTE includes twenty-two bits, which can address individual 1 KB DRAM pages.

In step 712, a modulus divider computes a remainder by dividing the page physical address by a number of available partitions. In step 714, a quotient divider computes a quotient value having Q bits by dividing the page physical address by the number of available partitions.

In step 720, a set of lower column bits is set to the lower bits of the linear physical address copied from the virtual address. In step 722, the partition address is set equal to the remainder computed in step 712. In step 724 the bank address is set to B least significant bits of the quotient computed in step 714. B is defined as a minimum number of bits needed to represent all DRAM banks in a DRAM 220 as a binary integer. In other words, $B=\text{Log}_2(\text{No\_of\_DRAM\_Banks})$.

In step 726, the column address is set to N lower quotient bits concatenated with the lower column bits. The N lower quotient bits, if any, comprise quotient bits adjacent to and more significant than the B least significant quotient bits. For scenarios with an effective DRAM bank size of 1 KB and DRAMs 220 with an actual DRAM bank size of 1 KB, N=0. For DRAMs 220 with an effective DRAM bank size of 1 KB and an actual DRAM bank size of 2 KB, N=1. For DRAMs 220 with an effective DRAM bank size of 1 KB and an actual DRAM bank size of 4 KB, N=2, and so forth. In step 728, the row address is set to Q-N-B most significant bits of the quotient computed in step 714.

The method terminates in step 750, where the memory interface 214 executes an access request to DRAMs 220 using the DRAM column address, the partition address, the DRAM bank address, and the DRAM row address. An entire virtual memory page of data may be retrieved from DRAM 220 and cached within the memory interface 214. In one embodiment, each partition 215 caches entire pages of memory data requested as individual byte or word requests of memory data. A specific requested word within the memory page can be returned first (critical word first), prior to retrieving other words for the virtual memory page.

Embodiments of the present invention contemplate address scrambling to improve memory performance. Pseudo-code shown in Table 2, below, illustrates one address scrambling technique that may be used within 64 KB boundaries to improve performance within a system comprising eight partitions. The "&" operator is a bitwise AND operator.

TABLE 2

{bank[2:0], partition[2:0]} = ({quotient[2:0], remainder[2:0]}
                              +quotient[8:3] + quotient[14:9]
                              +quotient[20:15] + quotient[21]) & 0x3F {row, upperColumnBits} = quotient[21:3]

Pseudo-code shown in Table 3, below, illustrates address scrambling for a system comprising an arbitrary number of partitions.

TABLE 3 partition[2:0] = remainder[2:0]

bank[2:0] = (quotient[2:0]
        +quotient[8:6] + quotient[11:9]
        +quotient[14:12] + quotient[17:15]
        +quotient[20:18]) + quotient[21]) & 0x7

{row, upperColumnBits} = quotient[21:3]

In certain processing units, a physical page may be characterized as a graphics page "kind" for two-dimensional surfaces, and a non-graphics page kind for general usage. Scrambling may be implemented for each type of page and a common mapping used to map the scrambled page address to a DRAM address. Pseudo-code shown in Table 4, below, illustrates address scrambling for a non-graphics kind of page. Changing PTE kind should only change address scrambling before the division operations when the number of partitions is a non-power of two. This ensures that resulting mappings have the same memory locations and 64 KB boundaries. The "^" operator is a bitwise exclusive-OR operator.

TABLE 4

Non-Graphics Page Kind Address Scrambling aScramble[9:0] = {A[12:10], A[6:0]}
aScramble[12:10] = ( A[9:7] ^ A[15:13] ^ A[18:16] ^ A[21:19] ^ A[24:22] ^ A[27:25] ^ A[30:28] ) & 0x7
aScramble[31:13] = A[31:13]

Pseudo-code shown in Table 5, below, illustrates address scrambling for a graphics kind of page.

TABLE 5

Graphics Page Kind Address Scrambling aScramble[9:0] = A[9:0]
aScramble[12:10] = ( A[12:10] ^ A[15:13] ^ A[18:16] ^ A[21:19] ^ A[24:22] ^ A[27:25] ^ A[30:28] ) & 0x7
aScramble[31:13] = A[31:13]

Pseudo-code shown in Table 6, below, illustrates the common mapping to a DRAM address.

TABLE 6

Common Mapping offset[9:0] = aScramble[9:0]
remainder[2:0] = aScramble[31:10] % NP
quotient [21:0] = aScramble[31:10] / NP
lowerColumnBits = offset[9:2]
partition[2:0] = remainder[2:0]

bank[2:0] = (quotient[2:0], remainder[5:3]}
        +quotient[8:6] + quotient[11:9]
        +quotient[14:12] + quotient[17:15]
        +quotient[20:18]) + quotient[21]) & 0x7

{row, upperColumnBits} = quotient[21:3]

In certain applications, such as multi-texture graphics applications, multiple different processing threads may access common two-dimensional surfaces in lockstep. This can result in access contention to common DRAM banks ("camping" on a partition with a DRAM hot spot). Scrambling partition mappings may help to diffuse access contention. Pseudo-code shown in Table 7, below, illustrates a technique for scrambling upper address bits to create linear physical address to DRAM address mappings that tend to diffuse DRAM hot spots in a system with eight partitions.

TABLE 7

Diffusing Resource Hotspots aScramble[21:0] = A[9:0] + ((A[21:19] + A[18:16] + A[15:13]
        +A[12:10]) & 0x7) << 10 + A[21:13]<< 13 offset[9:0] = aScramble[9:0]
remainder[2:0] = aScramble[31:10] % NP

TABLE 7-continued

Diffusing Resource Hotspots quotient[21:0] = aScramble[31:10] / NP
lowerColumnBits = offset[9:2]
partition[2:0] = remainder[2:0]
bank[2:0] = quotient[2:0
{row, upperColumnBits} = quotient[21:3]

Persons skilled in the art will recognize that the address generation and scrambling techniques taught herein may be beneficially implemented independently or in any combination, according to particular application requirements.

Embodiments of the present invention may be implemented directly in one or more logic circuits, including at least one divider circuit. Alternative embodiments may be implemented via programming instructions, such as microcode, configured to control a programmable circuit. Certain embodiments may be implemented within the memory interface 214 of FIG. 2. Certain aspects of the present invention may be implemented within the processing cluster 230. Persons skilled in the art will recognize that the present invention has broad applicability in address generation within processing units and may be implemented in other alternative forms without departing the scope or spirit of the invention.

In sum, a technique is disclosed for computing DRAM addresses from linear physical addresses in a memory subsystem with an arbitrary number of partitions. The page physical address of the linear physical address are divided by a number of available partitions by a modulo divider to generate a partition address. The page physical address of the linear physical address are divided by the number of available partitions in a quotient divider to generate a quotient. A bank address and row address are extracted from the quotient. In configurations where an actual DRAM bank is larger than an effective DRAM bank, one or more upper column address bits are extracted from low significance bits of the quotient. Lower address bits of the linear physical address are used to address bytes, or words of four bytes, within a given page. Virtual pages comprising integral power of two bytes are mapped to linear physical addresses, which are mapped to DRAM addresses that conform to DRAM page boundaries. Using this mapping technique, no memory space within the DRAMs is wasted or aliased. Furthermore, access for larger virtual pages, such as 64 KB virtual pages, is generally distributed over available partitions and DRAM banks.

One advantage of the disclosed systems and methods is that a processing unit may operate efficiently using a virtualized memory model in a configuration having an arbitrary number of active partitions, such as non integral power of two partitions. With this capability, processing units, which may otherwise be discarded as being defective, may be salvaged using floor sweeping techniques. In addition, this capability allows greater flexibility when configuring processing units for specific applications.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored;

and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for mapping a power-of-two sized virtual memory page to a non-power-of-two number of physical memory partitions the method comprising:
   converting a virtual address associated with the power-of-two sized virtual memory page into a linear physical address;
   computing a remainder by dividing the linear physical address by the non-power-of-two number of physical memory partitions, wherein the non-power of two number of physical memory partitions spans one or more memory units; and
   computing a physical memory address corresponding to the linear physical address by determining a memory partition address based on the remainder.

2. The method of claim 1 further comprising dividing the power of two sized virtual memory page into a power-of-two number of units of storage.

3. The method of claim 2, further comprising storing the power-of-two number of units of storage unevenly across the non-power-of-two number of physical memory partitions.

4. The method of claim 1, wherein computing the remainder by dividing the linear physical address by the non-power-of-two number of physical memory partitions, further comprises taking a modulo of the linear physical address by the non-power-of-two number of physical memory partitions, and wherein the physical memory address represents upper address bits of the linear physical address; and
   the memory partition address is determined by assigning the memory partition address to the remainder, wherein the memory partition address identifies one physical memory partition from the non-power-of-two number of physical memory partitions; and
   further comprising:
   computing a quotient by dividing the linear physical address by the non-power-of-two number of physical memory partitions;
   assigning a bank address to a first portion of the quotient, wherein the bank address identifies one bank from a plurality of banks within one of the memory units;
   assigning a column address to a set of lower bits of the linear physical address, wherein the column address identifies one unit of data from a row of data within the one memory unit; and
   assigning a row address to a second portion of the quotient, wherein the row address identifies one row from a plurality of rows within the one memory unit,
   wherein the memory partition address, bank address, column address and row address comprise the physical memory address.

5. The method of claim 4, wherein the step of assigning the column address further comprises the step of concatenating at least a third portion of the quotient to the set of lower bits of the linear physical address, wherein the bits comprising the first, second, and third portions of the quotient are non-overlapping.

6. The method of claim 4, further comprising the step of performing a physical memory access request based on the physical memory address.

7. The method of claim 6, wherein converting comprises mapping the virtual address associated with the power-of-two sized-virtual memory page to the linear physical address.

8. The method of claim 7, wherein the linear physical address is stored within a page table entry corresponding to the virtual address associated with the power-of-two sized virtual memory page, and the virtual address associated with the power-of-two sized virtual memory page is generated by a thread executing within a streaming multiprocessor.

9. The method of claim 8, wherein the power-of-two sized virtual memory page is stored across the plurality of physical memory partitions, and wherein at least one of the plurality of physical memory partitions stores more data from the power-of-two sized virtual memory page than other partitions of the plurality of physical memory partitions.

10. The method of claim 4, wherein the set of lower bits of the virtual address associated with the power-of-two sized virtual memory page comprises an adjacent, non-overlapping range of lower significance bits from the linear physical address and identifies a unique byte-level address within the physical memory page.

11. A non-transitory computer-readable medium including instructions that, when executed by a processing unit, cause the processing unit to map a power-of-two sized virtual memory page to a non-power-of two number of physical memory partitions spanning one or more memory units, by performing the steps of:
   converting a virtual address associated with the power-of-two sized virtual memory page into a linear physical address;
   computing a remainder by dividing the linear physical address by the non-power-of-two number of physical memory partitions, further comprises taking a modulo of the linear physical address by the non-power-of-two number of physical memory partitions, and wherein the physical memory address represents upper address bits of the linear physical address; and
   the memory partition address is determined by assigning the memory partition address to the remainder, wherein the memory partition address identifies one physical memory partition from the non-power-of-two number of physical memory partitions; and
   further comprising:
   computing a quotient by dividing the linear physical address by the non-power-of-two number of physical memory partitions;
   assigning a bank address to a first portion of the quotient, wherein the bank address identifies one bank from a plurality of banks within one of the memory units;
   assigning a column address to a set of lower bits of the linear physical address, wherein the column address identifies one unit of data from a row of data within the one memory unit; and
   assigning a row address to a second portion of the quotient, wherein the row address identifies one row from a plurality of rows within the one memory unit,
   wherein the memory partition address, bank address, column address and row address comprise the physical memory address.

12. The non-transitory computer-readable medium of claim 11, wherein the step of assigning the column address further comprises the step of concatenating at least a third portion of the quotient to the set of lower bits of the linear physical address, wherein the bits comprising the first, second, and third portions of the quotient are non-overlapping.

13. The non-transitory computer-readable medium of claim 12, wherein the set of lower bits of the virtual address associated with the power-of-two sized virtual memory page comprises an adjacent, non-overlapping range of lower significance bits from the linear physical address and identifies a unique byte-level address within the physical memory page.

14. A computer system, comprising:
a plurality of physical memory units,
a processing unit coupled to the plurality of memory devices and configured to access the plurality of physical memory computed from a linear physical address associated with a power-of-two sized virtual memory page, the processing unit comprising:
at least one streaming multiprocessor configured to generate memory access requests that each comprise a linear physical address; and
a memory interface configured to map the power-of-two sized virtual memory page to a non-power-of two number of physical memory partitions units using a physical memory address spanning one or more memory units by:
converting a virtual address associated with the power-of-two sized virtual memory page into a linear physical address;
computing a remainder by dividing the linear physical address by the non-power-of-two number of physical memory partitions, wherein the non-power of two number of physical memory partitions spans one or more memory units; and
computing a physical memory address corresponding to the linear physical address by determining a memory partition address based on the remainder.

15. The computer system of claim 14, wherein, to map, the memory interface is further configured to divide the power-of-two sized virtual memory page into a power-of-two number of units of storage.

16. The computer system of claim 15, wherein, to map, the memory interface is further configured to store the power-of-two number of units of storage unevenly across the non-power-of-two number of physical memory partitions.

17. The computer system of claim 14:
wherein computing the remainder by dividing the linear physical address by the non-power-of-two number of physical memory partitions, further comprises taking a modulo of the linear physical address by the non-power-of-two number of physical memory partitions, and wherein the physical memory address represents upper address bits of the linear physical address; and the memory partition address is determined by assigning the memory partition address to the remainder, wherein the memory partition address identifies one physical memory partition from the non-power-of-two number of physical memory partitions; and further comprising:

computing a quotient by dividing the linear physical address by the non-power-of-two number of physical memory partitions;

assigning a bank address to a first portion of the quotient, wherein the bank address identifies one bank from a plurality of banks within one of the memory units;

assigning a column address to a set of lower bits of the linear physical address, wherein the column address identifies one unit of data from a row of data within the one memory unit; and assigning a row address to a second portion of the quotient, wherein the row address identifies one row from a plurality of rows within the one memory unit, wherein the memory partition address, bank address, column address and row address comprise the physical memory address.

18. The computer system of claim 17, wherein, when assigning the column address, the memory interface is configured to concatenate at least a third portion of the quotient to the set of lower bits of the linear physical address, wherein the bits comprising the first, second, and third portions of the quotient are non-overlapping.

19. The computer system of claim 17, wherein the at least one streaming multiprocessor configured to map the virtual address associated with the power-of-two sized virtual memory page to the linear physical address.

20. The computer system of claim 17, wherein the set of lower bits of the virtual address associated with the power-of-two sized virtual memory page comprises an adjacent, non-overlapping range of lower significance bits from the linear physical address and identifies a unique byte-level address within the physical memory page.

* * * * *